United States Patent
Brundage et al.

(10) Patent No.: US 6,824,904 B2
(45) Date of Patent: Nov. 30, 2004

(54) REACTOR FOR PREFERENTIAL OXIDATION AND METHOD OF USE

(75) Inventors: Mark A. Brundage, Pittsford, NY (US); William H. Pettit, Rochester, NY (US); Rodney L. Borup, Los Alamos, NM (US)

(73) Assignee: General Motors Corporation, Detroit, MI (US)

( * ) Notice: Subject to any disclaimer, the term of this patent is extended or adjusted under 35 U.S.C. 154(b) by 250 days.

(21) Appl. No.: 10/133,840

(22) Filed: Apr. 26, 2002

(65) Prior Publication Data
US 2003/0203251 A1 Oct. 30, 2003

(51) Int. Cl.[7] .......................... H01M 8/04; H01M 8/06; B01J 8/04; C01B 31/20
(52) U.S. Cl. .......................... 429/20; 429/24; 422/190; 422/194; 422/193; 422/198; 423/437.2
(58) Field of Search .................. 429/17, 19, 20, 429/21, 24, 26; 423/437.2; 422/188, 189, 190, 191, 192, 193, 194, 195, 198

(56) References Cited

U.S. PATENT DOCUMENTS

| 4,650,727 | A | | 3/1987 | Vanderborgh et al. |
| 5,271,916 | A | | 12/1993 | Vanderborgh et al. |
| 5,316,871 | A | | 5/1994 | Swathirajan et al. |
| 5,518,705 | A | * | 5/1996 | Buswell et al. .......... 423/437.2 |
| 5,637,415 | A | | 6/1997 | Meltser et al. |
| 6,132,689 | A | | 10/2000 | Skala et al. |
| 6,284,206 | B1 | * | 9/2001 | Lesieur et al. .............. 422/198 |
| 6,403,049 | B1 | * | 6/2002 | Van Keulen et al. . 423/437.2 X |
| 6,562,499 | B1 | * | 5/2003 | Naka et al. .................... 429/19 |
| 6,602,478 | B2 | * | 8/2003 | Brundage .................... 422/194 |
| 2001/0014764 | A1 | * | 8/2001 | Brocker et al. ............. 585/260 |

FOREIGN PATENT DOCUMENTS

| EP | 941963 | * | 9/1999 | ............ H01M/8/06 |
| EP | 989621 | * | 3/2000 | ............ H01M/8/06 |
| JP | 2000-335904 | * | 12/2000 | ............ H01M/8/06 |

* cited by examiner

Primary Examiner—Stephen J. Kalafut
(74) Attorney, Agent, or Firm—Cary W. Brooks. Esq.; Linda M. Deschere, Esq.

(57) ABSTRACT

A preferential oxidation reactor is provided including a plurality of reactor sections. The reactor sections are individually optimized for operating at a preferred reaction temperature. In one embodiment, each reactor subsection includes a respective coolant flow for manipulating the operating temperature of the respective subsection. In another embodiment, a first section includes a lower temperature catalyst substrate, a second reactor section includes a higher temperature (i.e. normal) catalyst substrate and a third reactor section includes a lower temperature catalyst substrate. Yet another embodiment includes modifying the catalyst substrates of the respective subsections through the inclusion of promoters. Still another embodiment includes varying a density of the catalyst substrate across the reactor sections. Each of the embodiments enable quick light-off of the reactor, while limiting a reverse water-gas shift reaction.

31 Claims, 8 Drawing Sheets

REACTOR FOR PREFERENTIAL OXIDATION AND METHOD OF USE

FIELD OF THE INVENTION

The present invention relates to preferential oxidation reactors and more particularly to a multi-stage preferential oxidation reactor.

BACKGROUND OF THE INVENTION

Fuel cells have been proposed for many applications from electrical power plants to replacing internal combustion engines. Hydrogen is often used as the fuel and is supplied to an anode of the fuel cell. Oxygen (from air) is the oxidant and is supplied to a cathode of the fuel cell. A typical fuel cell is described in U.S. Pat. No. 5,316,871 to Swathirajan, et al.

The hydrogen used in the fuel cell can be derived from the reformation of methanol or other organics (e.g. hydrocarbons). Unfortunately, the reformate includes undesirably high concentrations of carbon monoxide (CO) which can quickly poison the fuel cell anode catalyst, and therefore, the CO must be removed. For example, in the methanol ($CH_3OH$) reformation process, methanol and water (as steam) are ideally reacted to generate hydrogen ($H_2$) and carbon dioxide ($CO_2$) according to the following reaction: $CH_3OH+H_2O \rightarrow CO_2+3H_2$.

This reaction is accomplished heterogeneously within a chemical reactor that provides the necessary thermal energy throughout a catalyst mass and yields a reformate gas comprising hydrogen, carbon dioxide, carbon monoxide and water. One such reformer is described in U.S. Pat. No. 4,650,727 to Vanderborgh. Carbon monoxide (i.e. about 1–3 mole %) is contained in the $H_2$-rich reformate exiting the reformer and must be removed or reduced to a non-toxic concentration to avoid poisoning the anode.

It is known that the carbon monoxide level in the reformate can be reduced by utilizing the water-gas shift reaction. To achieve this, a water-gas shift reactor is provided, within which water (as steam) could be added to the methanol reformate stream exiting the reformer, to lower its temperature and to increase the steam-to-carbon ratio therein. A lower reformate temperature and higher steam-to-carbon ratio serve to decrease the carbon monoxide content of the reformate according the following ideal water-gas shift reaction: $CO+H_2O \rightarrow CO_2+H_2$.

However, some carbon monoxide still remains after the water-gas shift reaction. Depending upon the reformate flow rate and the steam injection rate, the carbon monoxide content of the gas exiting the water-gas shift reactor can be as low as 0.5 mole %. Any residual methanol is converted to carbon monoxide and hydrogen in the shift reactor. Hence, the shift reactor reformate comprises hydrogen, carbon dioxide, water and some carbon monoxide.

The water-gas shift reaction does not sufficiently reduce to carbon monoxide content of the reformate (i.e., to below about 20 ppm) to avoid poisoning of the anode. Therefore, it is necessary to remove the remaining carbon monoxide from the hydrogen-rich reformate stream exiting the water-gas shift reactor prior to supplying it to the fuel cell. It is known that the so-called preferential oxidation (PrOx) reaction conducted in a suitable PrOx reactor can further reduce the CO content of $H_2$-rich reformate exiting the water-gas shift reactor. The PrOx reactor comprises a catalyst bed operated at a temperature that promotes the preferential oxidation of the CO by the $O_2$ in air, in the presence of the $H_2$, without consuming substantial quantities of the $H_2$. The PrOx reaction is: $CO+\frac{1}{2} O_2 \rightarrow CO_2$.

Often, the $O_2$ required for the PrOx reaction will be about two times the stoichiometric amount required to react the CO in the reformate. If surplus $O_2$ is utilized, then excessive consumption of $H_2$ results. Alternatively, if the amount of $O_2$ is less than the stoichiometric amount needed, insufficient CO oxidation will occur. The PrOx process is described in a paper entitled, "Methanol Fuel Processing For Low Temperature Fuel Cells" published in the Program and Abstracts of the 1988 Fuel Cell Seminar, Oct. 23–26, 1988, Long Beach, Calif. and in U.S. Pat. No. 5,271,916 to Vanderbourgh and U.S. Pat. No. 5,637,415 to Mester, iner alia. U.S. Pat. Nos. 5,637,415 and 5,316,871, are each incorporated herein by reference.

Generally, PrOx reactors may be either (1) adiabatic, (i.e., where the temperature of the catalyst is allowed to rise due to oxidation of the CO), or (2) isothermal (i.e., where the temperature of the catalyst is maintained substantially constant by removing the heat generated during the oxidation of the CO). The adiabatic PrOx process typically includes a number of sequential stages that progressively reduce the CO content to avoid excessively high temperatures in one stage, damaging the catalyst. Thus, temperature control is very important in adiabatic systems. The increased temperature may also result in a reverse water-gas shift reaction (RWGS) which increases the CO content. The isothermal process can produce the same CO reduction as the adiabatic process, but in fewer stages (e.g. one or two stages) and without the concern of a reverse water-gas shift reaction.

In summary, within a PrOx reactor there are three main reactions. These include the desired CO oxidation ($CO+\frac{1}{2}O_2 \rightarrow CO_2$), $H_2$ oxidation ($H_2+\frac{1}{2}O_2 \rightarrow H_2O$) and the reverse water-gas shift ($H_2+CO_2 \rightleftharpoons CO+H_2O$). As discussed above, the CO oxidation reaction is desired because it reduces the CO content. However, CO oxidation and $H_2$ oxidation directly compete for the available $O_2$. Both reactions are exothermic, with the former being slightly more exothermic. The reverse water-gas shift reaction is an equilibrium reaction, generally occurring after all of the $O_2$ has been consumed. The reverse water-gas shift reaction is dependent upon CO concentration and temperature (i.e., low CO content and high temperature are more favorable for CO formation). Because both the CO and $H_2$ oxidation reactions are exothermic, favorable conditions are created for a reverse water-gas shift reaction. Thus, good temperature control is essential within the PrOx reactor to prevent a reverse water-gas shift reaction. One critical time point is during start-up of the PrOx reactor, during which PrOx reactors are prone to allowing poisonous CO to enter the fuel cell stack.

Therefore, it is desirable in the industry to provide an improved PrOx reactor for reducing CO concentration within a fuel reformate stream. The PrOx reactor should enable quicker light-off during start-up and limit any RWGS reaction.

SUMMARY OF THE INVENTION

Accordingly, the present invention provides a preferential oxidation reactor for reducing carbon monoxide within a reformate stream passing therethrough. In one embodiment, the preferential oxidation includes at least first and second reactor sections. The first reactor section has a first gas passage through which the gas stream flows, and a surface supporting a first catalyst for promoting oxidation of carbon monoxide in the gas stream. The second reactor section has a second gas passage in flow communication with the first gas passage and has a surface supporting a second catalyst. A control means is also provided for maintaining a first temperature within the first gas passage at a value different than a second temperature within the second gas passage. The first catalyst promotes oxidation of the carbon monoxide at a greater rate at the first temperature, as compared to a rate at which the second catalyst is operable at the first temperature to oxidize the carbon monoxide.

In another embodiment, the preferential oxidation reactor further includes a third reactor section having a third gas passage through which the gas stream flows, and having a surface supporting a third catalyst. The control means maintains a third temperature within the third gas passage at a value different than the first and second temperatures within the first and second gas passages. The reformate stream sequentially passes through the first, second, and third reactor sections with the first temperature being lower than the second temperature for enabling quicker light-off of the first reactor section and the third temperature being lower than either of the first and second temperatures for limiting a reverse water-gas shift reaction. Optionally, a catalyst density of each section may decrease through the first, second, and third sections. The selection of catalyst for the first section makes it possible to achieve oxidation of CO, or light-off, at a relatively low temperature relative to the second temperature.

In one preferred embodiment, the present invention further provides coolant flow in heat transfer relationship with the reaction sections. A first coolant flow is in heat exchange relation with the first reactor section for controlling the first temperature, a second coolant flow is in heat exchange relation with the second reactor section for controlling the second temperature, and a third coolant flow is in heat exchange relation with the third reactor section for controlling the third temperature. Preferably, the first, second, and third coolant flows respectively vary in volume.

In another preferred embodiment, the present invention further provides a first catalyst substrate operatively disposed within the first reactor section, a second catalyst substrate operatively disposed within the second reactor section, and a third catalyst substrate operatively disposed within the third reactor section. The first catalyst substrate is a lower temperature catalyst substrate than the second catalyst substrate for enabling quick light-off of the first reactor section, and the third temperature catalyst substrate is a lower temperature catalyst substrate than the second catalyst substrate for limiting the reverse gas-water shift reaction.

Finally, in accordance with a further preferred embodiment, the present invention provides a first catalyst substrate having a first reaction promoter and operatively disposed within the first reactor section, a second catalyst substrate having a second reaction promoter and operatively disposed within the second reactor section and a third catalyst substrate having a third reaction promoter and operatively disposed within the third reactor section. The first promoter enables operation of the first reactor section at a first temperature range, the second promoter enables operation of the second reactor at second temperature range and the third promoter enables operation of the third reactor at a third temperature range. Preferably, the second temperature range is higher than the first and third temperature ranges. It should be understood that the temperature ranges may overlap, provided that the operating temperature selected for each reactor section differs, in accordance with the invention. In another aspect, the temperature is selected so as to optimize the catalyst utilized for the reaction. The present invention is illustrated with reference to reaction surfaces having different catalytic characteristics. It should be understood that the invention is operable in a single reactor chamber or in a series of different reactor chambers. However, the reaction chamber, or chambers, are configured to optimize the catalyst and temperature along the flow path of the gas stream for reaction of CO therein.

One advantage of the present invention is that the preferential oxidation reactor initially provides a lower temperature oxidation reactor section for enabling quicker light-off.

Yet another advantage of the present invention is that the preferential oxidation reactor provides a final lower temperature and lower catalyst density oxidation reactor section for limiting the RWGS reaction.

Overall, the present invention provides a more efficient method and apparatus for treating a reformate stream, thereby providing a cleaner reformate as fuel to a fuel cell stack.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
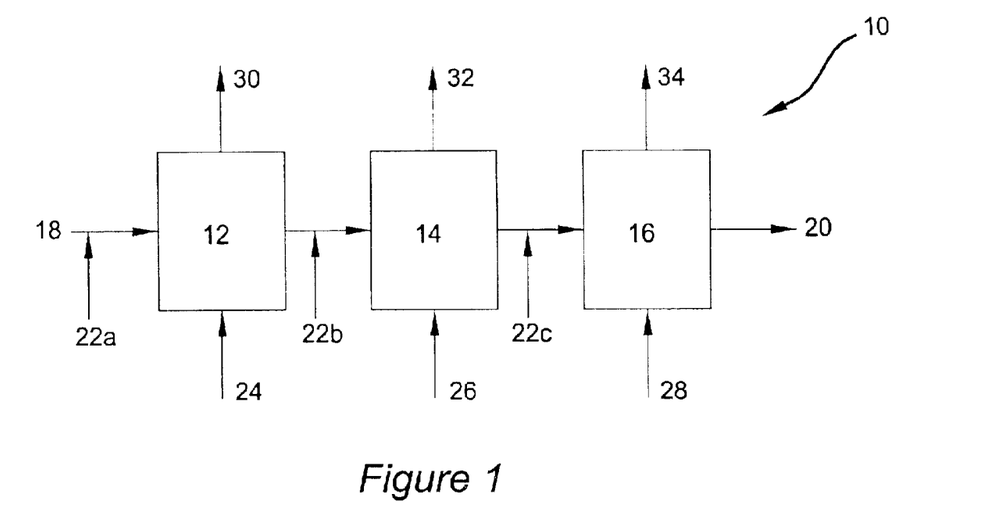
FIG. 1 is a schematic view of a preferential oxidation reactor in accordance with the principles of the present invention.

With reference to FIG. 1, the present invention provides a preferential oxidation reactor, also referred to as a variable section preferential oxidation reactor (VS-PrOx) 10. The VS-PrOx 10 is usable to treat a CO contaminate in an $H_2$-rich reformate stream, regardless of the method by which the stream was obtained. The stream may be prepared from methanol, or other hydrocarbons, for example an alkane ($C_nH_{2n+2}$), or other aliphatic or aromatic hydrocarbons. In the case of such acyclic hydrocarbons several steps for preparation include prior partial oxidation in air, reaction with steam, and one or more water-gas shift steps to obtain the CO contaminating $H_2$-rich reformate stream to be treated by the VS-PrOx 10.

As stated earlier, at least two sections are preferred, one for quick light-off and the other to promote the selective oxidation of CO. The invention will be illustrated with reference to three sections which is most preferred. The VS-PrOx 10 includes first, second and third reactor sections 12, 14, 16, respectively, adjacently disposed to one another and in fluid communication with one another for enabling reformate flow through the VS-PrOx 10. The first reactor section 12 includes an inlet conduit 18 conveying the reformate flow into the VS-PrOx 10 and the third reactor section 16 includes an outlet conduit 20 exhausting the reformate flow from the VS-PrOx 10. The reformate stream entering the VS-PrOx 10 is mixed with oxygen (i.e., air) injected into the stream ahead of the individual reactor sections 12, 14, 16 via control valves 22a, 22b, and 22c, and exits the VS-PrOx 10 having a significantly lower CO content. It will be appreciated that the control valves 22a, 22b, and 22c may be replaced by other means, such as pulsed air injectors. Air injection locations may be varied depending upon the characteristics of the catalysts (i.e., only two injection points may be utilized thus creating a two stage VS-PrOx).

Coolant inlets 24, 26, 28 and coolant outlets 30, 32, 34 are respectively provided for each of the reactor sections 12, 14, 16. The coolant inlets 24, 26, 28 and outlets 30, 32, 34 enable conveyance and exhaust of a coolant medium for cooling the respective reactor sections 12, 14, 16. The VS-PrOx 10 facilitates both selective oxidation of CO in the presence of a catalyst, (such as an Ir-catalyst) and maintains the reactor chamber temperature within a desired range.

Figure 2:
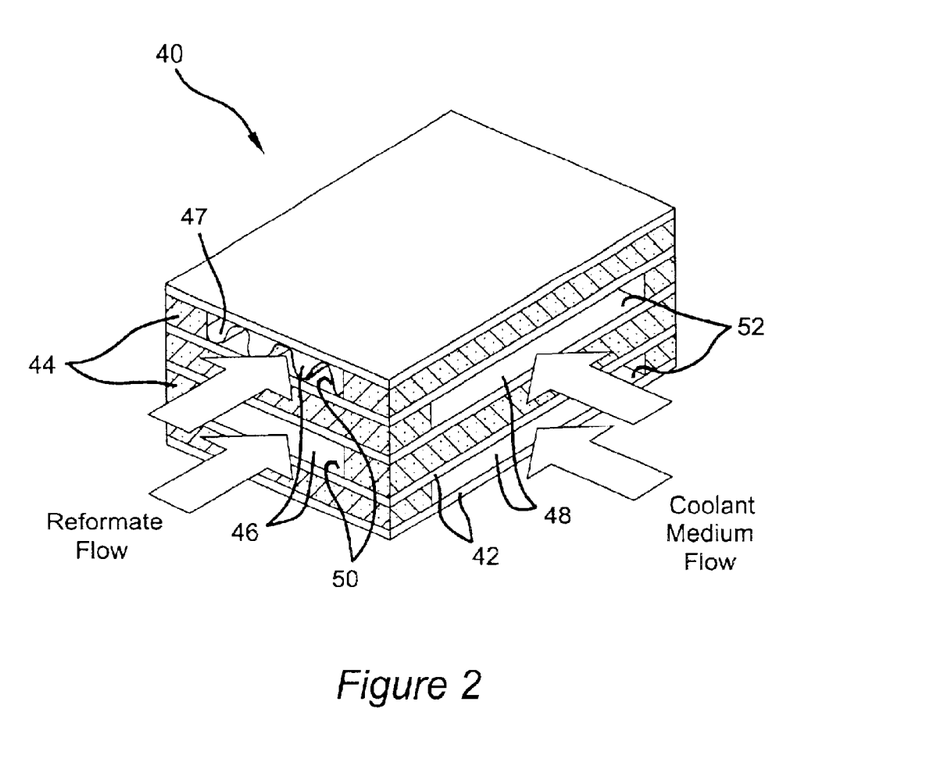
FIG. 2 is a schematic view of stacked substrate members of the preferential oxidation reactor.

With reference to FIG. 2, a schematic view of a portion 40 of the first, second and third reactor sections 12, 14, 16, is shown. Such portion 40 is similar for each of the reactor sections 12, 14, 16. The portion 40 includes generally parallel lying support member substrates 42 separated by separators 44. The support member substrates 42 are offset from one another by the separators 44, providing flow passages therebetween. A first set of flow passages 46 enable reformate flow between the support member substrates 42. A second set of flow passages 48 enable coolant medium flow therebetween. The support member substrates 42 each have a first surface 50 carrying the active catalyst and a second surface 52, opposite the first surface, for heat transfer to a cooling medium. Accordingly, the first surfaces 50 face the reformate flow passages 46 and the second surfaces 52 face the coolant flow passages 48. In this manner, exothermic heat resulting from the CO oxidation reaction is removed, thereby maintaining the active catalyst within a desired temperature range. Thus, the VS-PrOx 10 shown here also functions as a heat exchanger.

The catalyst coated surfaces 50 are formed by applying a catalyzed washcoat. In one embodiment, the catalyst-containing washcoat is a composition which comprises a precious metal catalyst carried on a high surface area support (washcoat). One exemplary composition is Pt supported on $Al_2O_3$, or other refractory oxide. The catalyst washcoat is also referred to as a catalyst substrate.

The catalyst-coated surface area contained within the flow passage 46 can be increased by the addition of corrugated material (fins) or reticulated foam into the flow passage. The fins or foam increase the available catalyst surface area in the flow passage 46. The fins and foam also introduce a heat transfer resistance. This increased heat transfer resistance requires the use of a higher temperature catalyst. According to this embodiment, the flow passage 46 comprises one or more convoluted elements 47, which increases surface area within the flow passage 46, as compared to a passage of the same cross-sectional area having an open cross-section. Here, the convoluted element 47 is a form or shape that is folded, curved or contains a tortuous path as in an open cell foam. The larger the channel height in flow passage 46, the larger is the heat transfer resistance which results. Thus, for the same cooling fluid flow and temperature, different temperature catalysts can be utilized by varying the flow passage height containing fins or foam.

Figure 3:
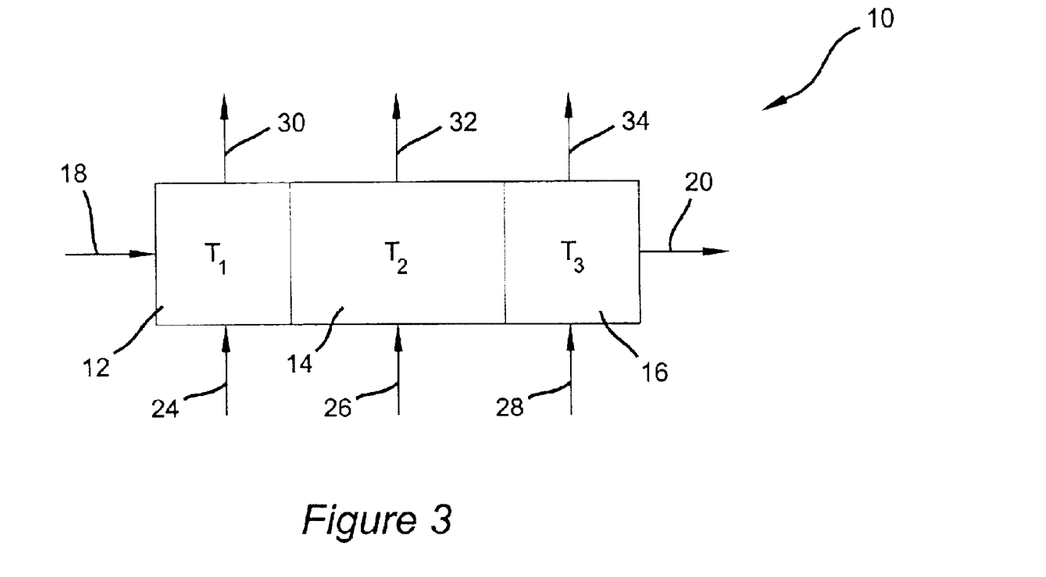
FIG. 3 is a schematic view of the preferential oxidation reactor having subsections with varying coolant flow therethrough.
Figure 4:
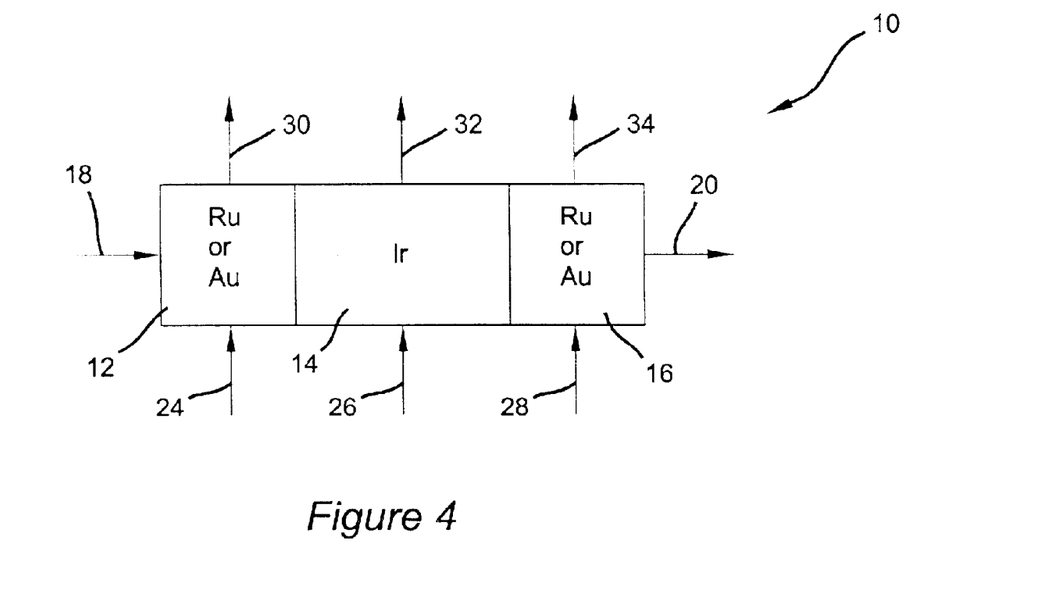
FIG. 4 is a schematic view of the preferential oxidation reactor having subsections with varying substrate catalysts.
Figure 5:
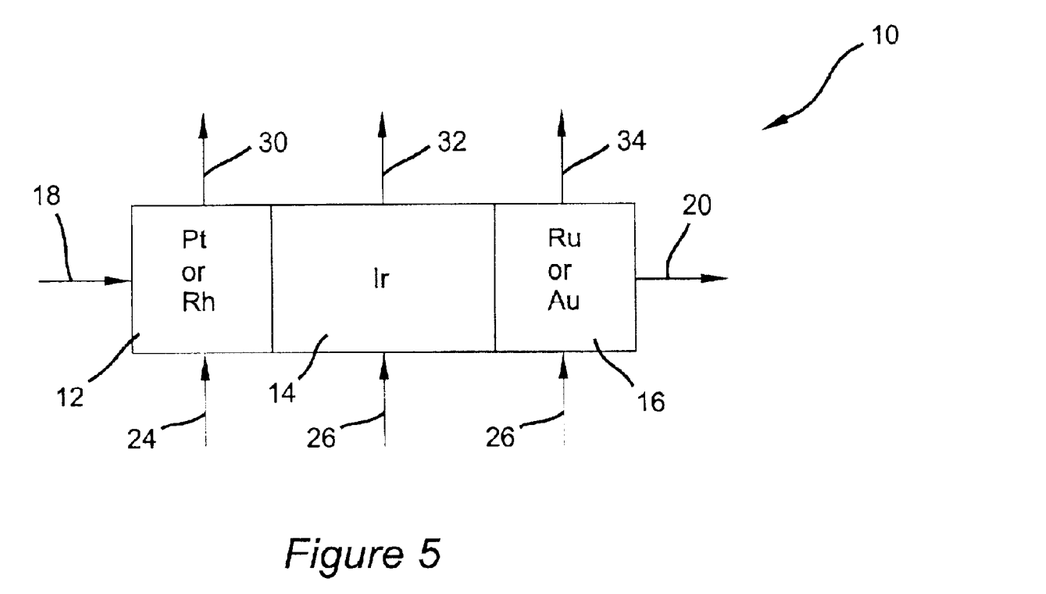
FIG. 5 is a schematic view of the preferential oxidation reactor of FIG. 4, having subsections with alternative substrate catalysts.

With reference to FIGS. 3 through 5, the preferred embodiments of the present invention will be discussed in detail. In accordance with one preferred method of the present invention, the coolant medium inlets 24, 26, 28 and outlets 30, 32, 34 enable variable coolant flow through the respective reactor sections. In this manner, each reactor section 12, 14, 16 can be cooled to a different operating level for limiting the $H_2$ oxidation and RWGS reactions. Ideally, the first section 12 is maintained at a lower temperature than the second 14, thereby enabling faster light-off. The second reactor section 14 operates at a normal temperature for enabling sufficient CO oxidation. The third reactor section 16 is preferably at a sufficiently low operating temperature for limiting the RWGS reaction after equilibrium of the reformate stream has been achieved through the first and second sections 12, 14.

In the case of a preferred two-stage VS-PrOx 10, the first reactor section 12 operates at a normal temperature for enabling sufficient CO oxidation. The second reactor section 14 is preferably at a sufficiently low operating temperature for limiting the RWGS reaction after equilibrium of the reformate stream has been achieved through the first section 12. In the case of an alternative two-stage VS-PrOx 10, the first reactor section 12 operates at a lower temperature for enabling light-off and the second reactor section 14 operates at a normal temperature for enabling sufficient CO oxidation.

Any one of a number of methods can be implemented for varying the coolant medium flowrates through the respective reactor sections 12, 14, 16. One such method is to vary the cross-section of the inlets 24, 26, 28 and outlets 30, 32, 34, between the reactor sections 12, 14, 16. For example, a smaller cross-section results in reduced coolant volume flow therethrough and thus reduced cooling capability. An alternative method is to implement restrictor valves (not shown) respectively associated with each of the inlets 24, 26, 28, that restrict the amount of coolant flow through the respective inlet. Another alternate method is to implement the different coolant streams available within an FP (fuel processor) based system. Any of these methods enable the use of a single coolant medium source (not shown), thereby simplifying overall system requirements.

Another preferred method of the present invention includes the implementation of different catalysts between the reactor sections 12, 14, 16, each of the reactor sections 12, 14, 16 including a different, optimized catalyst formulation. As such, a lower temperature catalyst is implemented in the first reactor section 12 for faster light-off (i.e. more quickly achieving operational temperature). In accordance with this method, the first reactor section 12 preferably includes a lower temperature catalyst such as Ruthenium (Ru) or Gold (Au). Alternatively, a highly active catalyst, such as Platinum (Pt) or Rhodium (Rh), may be implemented in the first reactor section 12. In this manner, quick light-off of the VS-PrOx 10 may be achieved within the first reactor section 12. The second reactor section 14 preferably includes a selective catalyst such as Iridium (Ir), Pt or Palladium (Pd). Ir is preferable because of its $O_2$ selectivity to CO and reduced RWGS activity. Finally, in the third reactor section 16, a low temperature catalyst may be implemented, such as Ru and Au. In this manner, the third reactor section 16 operates at a lower temperature, thereby limiting RWGS after equilibrium of the reformate stream has been achieved.

Figure 6:
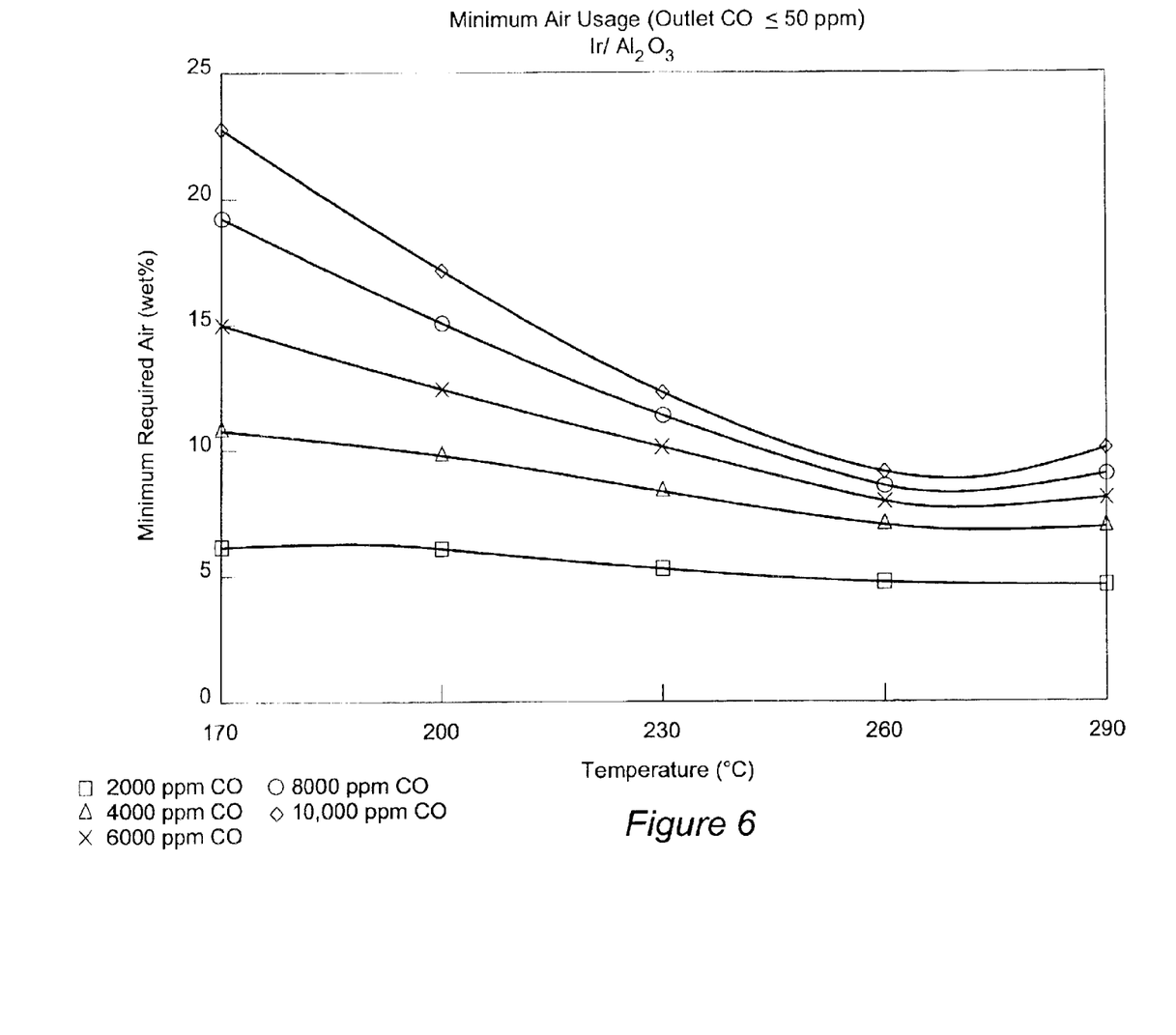
FIG. 6 is a graph displaying the minimum air required for five levels of CO versus temperature for 2% Ir on an $Al_2O_3$ washcoat.
Figure 7:
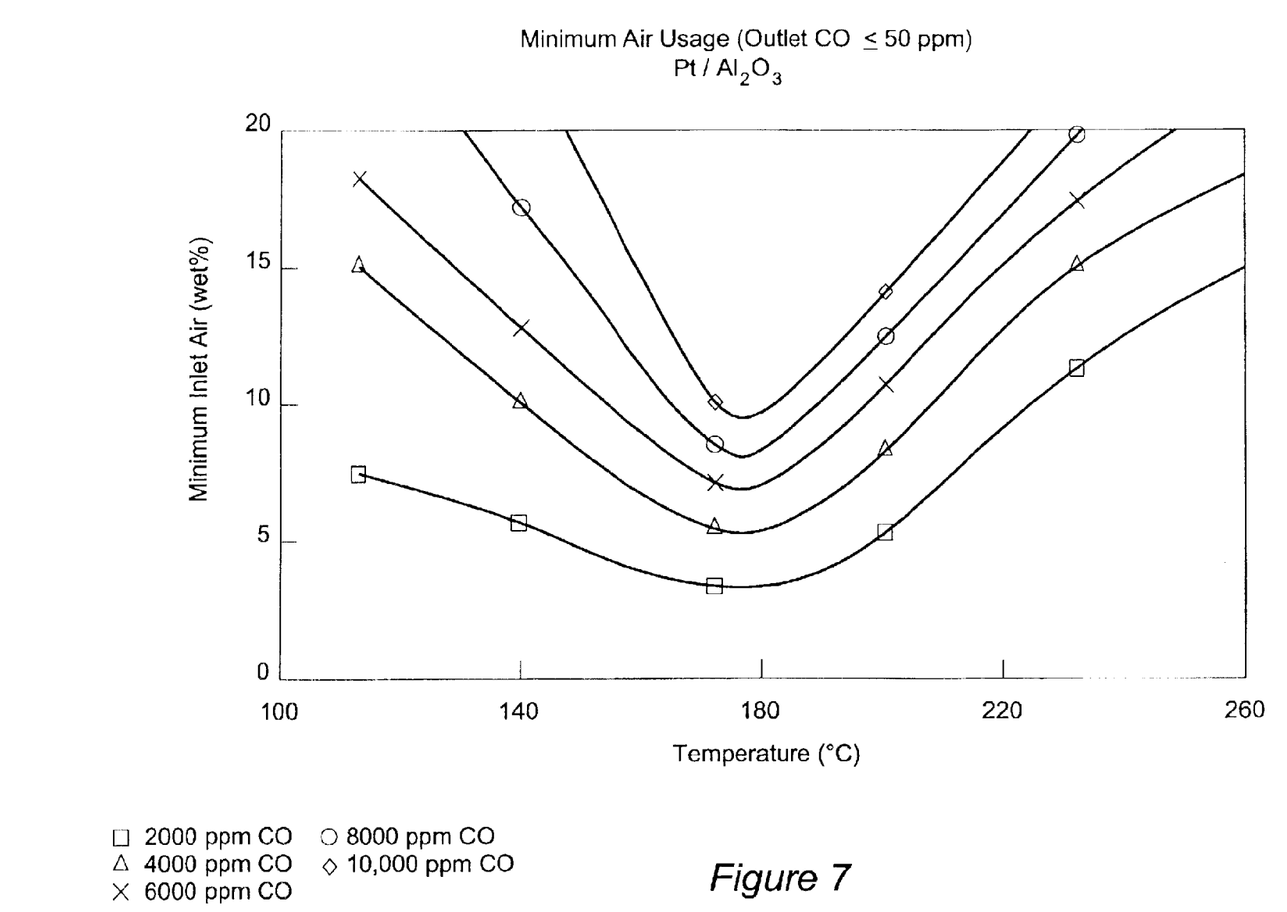
FIG. 7 is a graph displaying the minimum air required for 5 levels of CO versus temperature for 2% Pt on an $Al_2O_3$ washcoat.
Figure 8:
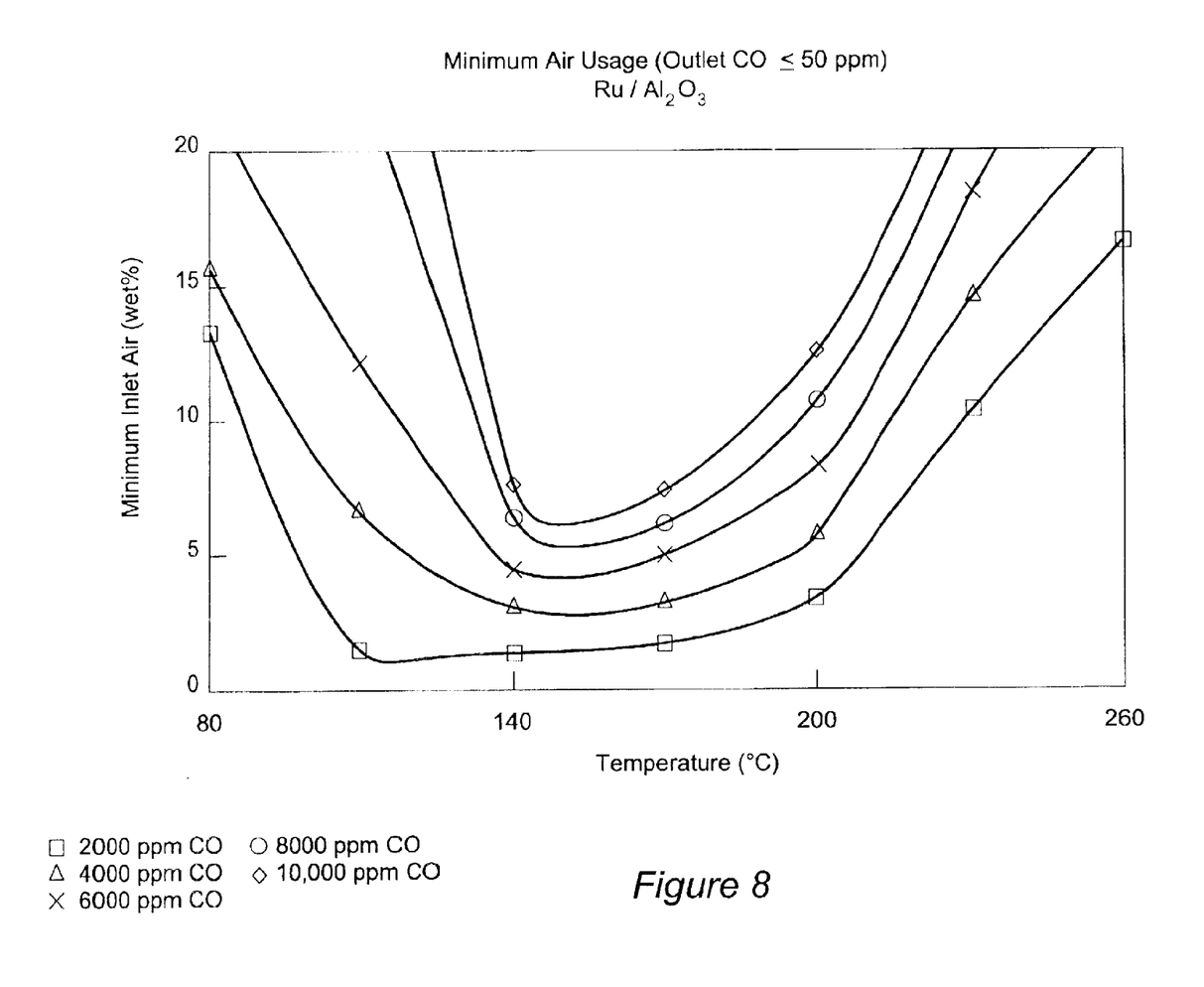
FIG. 8 is a graph displaying the minimum air required for 5 levels of CO versus temperature for 2% Ru on an $Al_2O_3$ washcoat.

With particular reference to FIG. 6 the graph displays the minimum air required for five levels of CO versus temperature for 2% Ir on an $Al_2O_3$ washcoat. As shown, the optimum operational temperature range is 250–280° C. In comparison, the graph of FIG. 7 shows the minimum air required for 5 levels of CO versus temperature for 2% Pt on an $Al_2O_3$ washcoat. As shown, the optimum operational temperature range has been lowered to 150–190° C. The graph of FIG. 8 shows the minimum air required for 5 levels of CO versus temperature for 2% Ru on an $Al_2O_3$ washcoat. As shown, the optimum operational temperature range has been lowered to 120–160° C.

Figure 9:
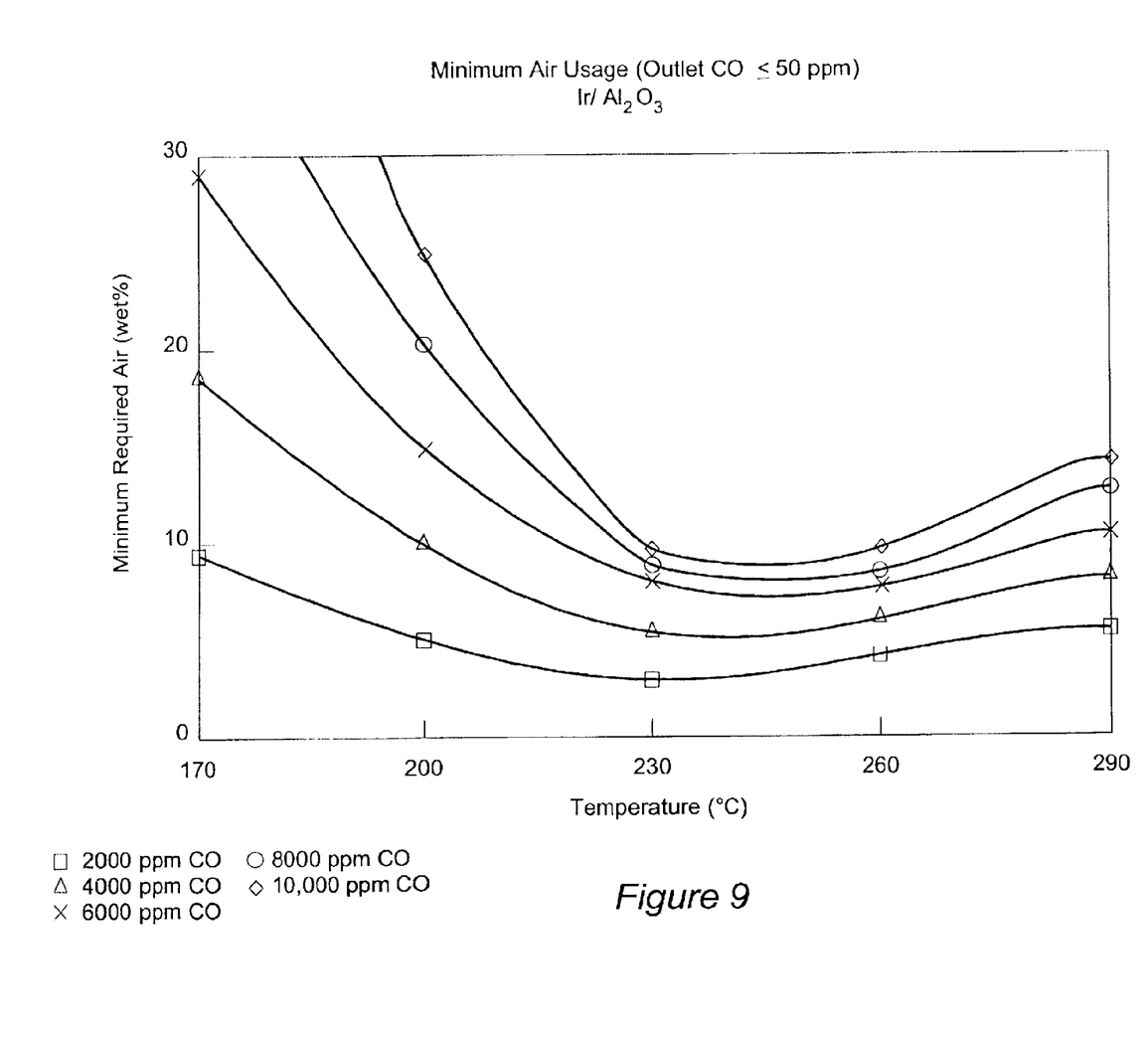
FIG. 9 is a graph displaying the temperature characteristics for 2% Ir on $Al_2O_3$ with approximately three times the catalyst concentration than that displayed in FIG. 6.

Yet another preferred method of the present invention is to vary the catalyst concentration across the reactor sections 12, 14, 16. Catalyst concentration is also referred to as catalyst density, typically expressed as weight of catalyst per unit area of reaction surface. The first reactor section 12 includes the highest catalyst concentration for faster light-off during start-up and to react most of the CO. The catalyst concentration then decreases from the first reactor section 12 through the second and third reactor sections 14, 16, thereby limiting the RWGS reaction. It is foreseen that the decrease in the catalyst concentration may be of the form of a step decrease, linear decrease, exponential decay, or any other form known in the art. For example, compare FIG. 9, temperature characteristics for 2% Ir on $Al_2O_3$ having conventional catalyst concentration (about 200 g/m$^2$), with the sample of FIG. 6, which has significantly less loading. As seen, the optimum temperature has been lowered to 220–260° C. In this manner, the first reactor section 12, having a higher catalyst concentration decreases the light-off temperature.

Figure 10:
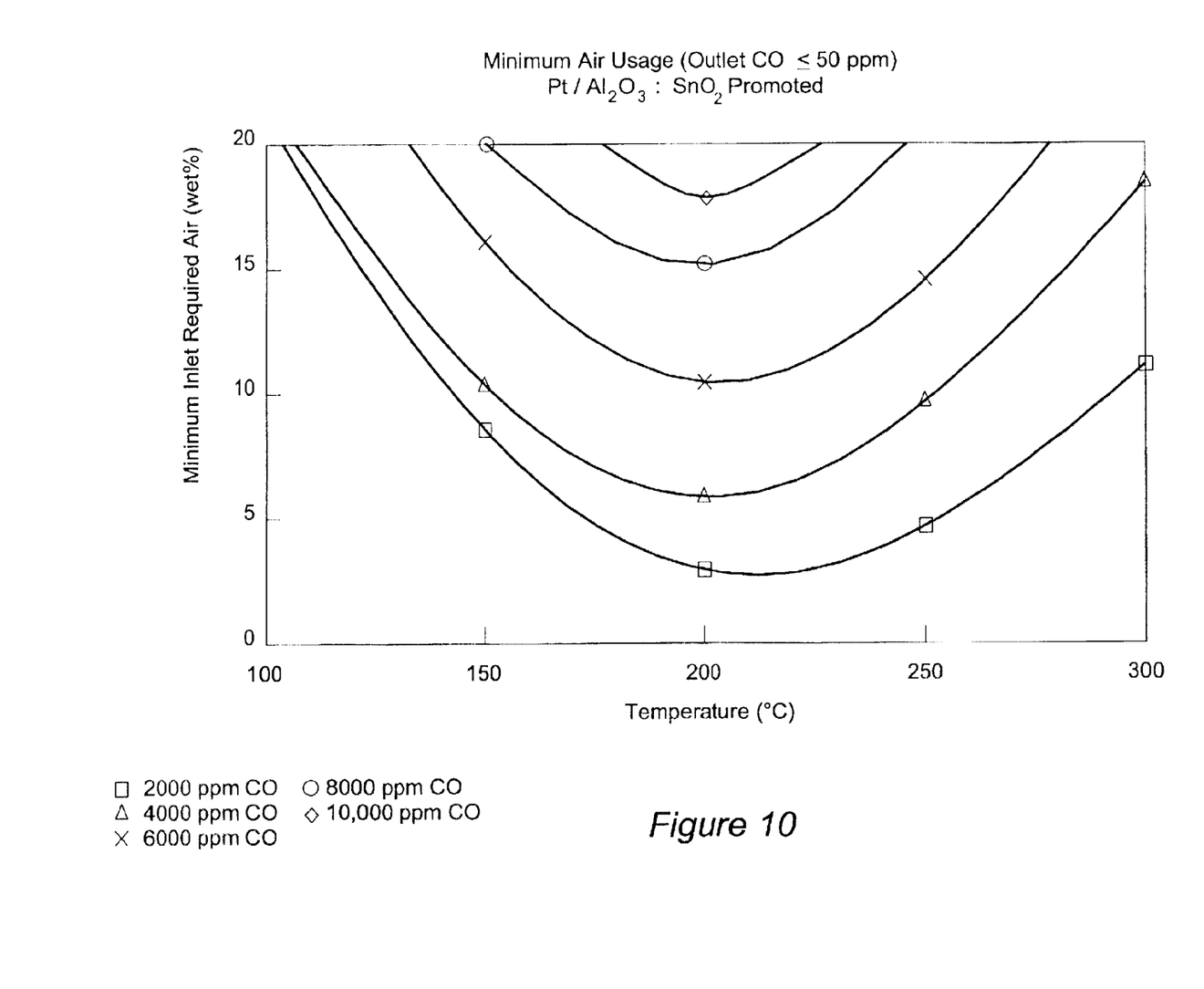
FIG. 10 is a graph displaying the temperature characteristics for 2% Pt on $Al_2O_3$ promoted with $SnO_2$.

Another aspect of the present invention includes modification of the catalyst washcoat on the support member substrates 42 through the addition of promoters such as a metal oxide. Such metal oxides include, but are not limited to, $Fe_2O_3$, $TiO_2$, and $SnO_2$. Promoters may further include any transition metals, lanthanides and actanides. With particular reference to FIG. 10, the graph displays the minimum air required for five levels of CO versus temperature for 2% Pt on an $Al_2O_3$ washcoat promoted with $SnO_2$. As shown, the optimum operational temperature range has been increased to 200–220° C., as compared to the Pt/$Al_2O_3$ only sample at 150–190° C. shown in FIG. 7. In this example, the promoter adjusts the optimum temperature range for selective oxidation of CO. The adjustment is either a decrease or an increase in the optimum temperature range, depending upon the particular promoter implemented.

In general, the VS-PrOx 10 of the present invention provides the characteristics of (1) compartmentalizing the PrOx catalysts, (2) a lower light-off temperature PrOx catalyst in front followed by normal PrOx catalysts, (3) varying catalyst metal concentration and (4) varying catalyst metal loading. It will be appreciated that each of the methods described hereinabove can be applied separately or in combination. Further, it is anticipated that the VS-PrOx 10, implementing the methods described herein, may be adiabatic or isothermal, as well as using multi-port injection of air. The features of the VS-PrOx 10, as detailed herein, enable the VS-PrOx 10 to improve start-up time and limit RWGS, thereby providing a more efficient PrOx reactor than those known in the art.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A preferential oxidation reactor for reducing a carbon monoxide content of a gas stream which contains hydrogen, the reactor comprising:

at least first and second reactor sections;

said first reactor section having a first gas passage through which the gas stream flows, and having a surface supporting a first catalyst comprising a first metal for promoting oxidation of carbon monoxide in the gas stream;

said second reactor section having a second gas passage in flow communication with said first gas passage and having a surface supporting a second catalyst comprising a second metal different from the said metal; and control means for maintaining a first temperature within said first gas passage at a value different than a second temperature within said second gas passage; wherein said first catalyst is characterized by promoting oxidation of the carbon monoxide at a different rate at said first temperature, as compared to a rate at which said second catalyst is operable at said first temperature to oxidize the carbon monoxide.

2. The preferential oxidation reactor of claim 1, wherein said first catalyst comprises a support different than said second catalyst support.

3. The preferential oxidation reactor of claim 1, further comprising a third reactor section having a third gas passage through which the gas stream flows, and having a surface supporting a third catalyst comprising a third metal.

4. The preferential oxidation reactor of claim 3, wherein said third catalyst has a composition different from at least one of said first and second catalysts.

5. The preferential oxidation reactor of claim 3, wherein a density of said third catalyst differs from a density of at least one of said first and second catalysts.

6. The preferential oxidation reactor of claim 3, wherein said third metal is selected from a group consisting of ruthenium (Ru), gold (Au).

7. The preferential oxidation reactor of claim 1, wherein a density of said first catalyst differs from a density of said second catalyst.

8. The preferential oxidation reactor of claim 1, wherein each of said first and second gas passages include at least one convoluted element for supporting said respective catalysts.

9. The preferential oxidation reactor of claim 8, wherein said at least one convoluted element is selected from a group consisting of foam, fins and corrugated sheet.

10. The preferential oxidation reactor of claim 1, wherein said control means comprises first and second coolant passages respectively associated with said first and second reactor sections and in respective heat transfer relationship with said first and second gas passages.

11. The preferential oxidation reactor of claim 10, wherein said control means varies respective coolant flows through said first and second coolant passages and a temperature of said coolant flows, thereby controlling said first and second temperatures of said first and second gas passages.

12. The preferential oxidation reactor of claim 1, wherein said first metal is selected from a group consisting of ruthenium (Ru), gold (Au) and mixtures thereof.

13. The preferential oxidation reactor of claim 1, wherein said second metal is selected from a group consisting of iridium (Ir), platinum (Pt), palladium (Pd) and mixtures thereof.

14. The preferential oxidation reactor of claim 1, wherein respective densities of said first and second catalysts decrease in a flow path direction of the gas stream.

15. The preferential oxidation reactor of claim 1 wherein said first catalyst is characterized by promoting oxidation of the carbon monoxide at a greater rate at said first temperature, as compared to a rate at which said second catalyst is operable at said first temperature to oxidize the carbon monoxide.

16. A fuel cell system comprising a preferential oxidation reactor according to claim 1, wherein said preferential oxidation reactor comprises a single reactor chamber having said at least first and second reactor sections.

17. A preferential oxidation reactor for reducing a carbon monoxide content of a gas stream which contains hydrogen, the reactor comprising:
at least first, second and third reactor sections;
said first reactor section having a first gas passage through which the gas stream flows, and having a surface supporting a first catalyst for promoting oxidation of carbon monoxide in the gas stream;
said second reactor section having a second gas passage in flow communication with said first gas passage and having a surface supporting a second catalyst; and
said third reactor section having a third gas passage through which the gas stream flows, and having a surface supporting a third catalyst; and
control means for maintaining a first temperature within said first gas passage at a value different than a second temperature within said second gas passage,
wherein said first catalyst is characterized by promoting oxidation of the carbon monoxide at a different rate at said first temperature, as compared to a rate at which said second catalyst is operable at said first temperature to oxidize the carbon monoxide; and
wherein respective densities of said first, second and third catalysts decrease in a flow path direction of the gas stream.

18. A preferential oxidation reactor for reducing a carbon monoxide content of a gas stream which contains hydrogen, the reactor comprising:
at least first and second reactor sections;
said first reactor section having a first gas passage through which the gas stream flows, and having a surface supporting a first catalyst for promoting oxidation of carbon monoxide in the gas stream;
said second reactor section having a second gas passage in flow communication with said first gas passage and having a surface supporting a second catalyst; and
control means for maintaining a first temperature within said first gas passage at a value different than a second temperature within said second gas passage,
wherein said first catalyst is characterized by promoting oxidation of the carbon monoxide at a different rate at said first temperature, as compared to a rate at which said second catalyst is operable at said first temperature to oxidize the carbon monoxide; and
wherein at least one of said first and second catalysts further comprises a promoter for promoting the oxidation of the carbon monoxide at a temperature different than the temperature at which such oxidation would occur without said promoter.

19. The preferential oxidation reactor of claim 18, wherein said promoter is tin oxide ($SnO_2$).

20. A preferential oxidation reactor for reducing a carbon monoxide content of a gas stream which contains hydrogen, the reactor comprising:
at least first, second and third reactor sections;
said first reactor section having a first gas passage through which the gas stream flows, and having a surface supporting a first catalyst for promoting oxidation of carbon monoxide in the gas stream;
said second reactor section having a second gas passage in flow communication with said first gas passage and having a surface supporting a second catalyst;
said third reactor section having a third gas passage through which the gas stream flows, and having a surface supporting a third catalyst; and
control means for maintaining a first temperature within said first gas passage at a value different than a second temperature within said second gas passage,
wherein said first catalyst is characterized by promoting oxidation of the carbon monoxide at a different rate at said first temperature, as compared to a rate at which said second catalyst is operatable at said first temperature to oxidize the carbon monoxide; and
wherein at least one of said first, second and third catalysts further comprises a promoter for promoting the oxidation of the carbon monoxide at a temperature different than the temperature at which such oxidation would occur without said promoter.

21. The preferential oxidation reactor of claim 20, wherein said promoter is tin oxide ($SnO_2$).

22. A method for treating a hydrogen-containing reformate stream within a preferential oxidation reactor to reduce the carbon monoxide content of the reformate stream, said method comprising the steps of:
reacting a first portion of carbon monoxide in the reformate stream at a first temperature in the presence of a first catalyst comprising a first metal within a first section of the reactor to oxidize said first portion of carbon monoxide;
directing the reformate stream from said first reactor section to a second reactor section;
reacting a second portion of carbon monoxide in the reformate stream in said second reactor section in the presence of a second catalyst comprising a second metal different from the said first metal at a second temperature to oxidize a second portion of the carbon monoxide; and
maintaining said second temperature lower than said first temperature.

23. The method of claim 22 further comprising the steps of:

directing the reformate stream from said second reactor section to a third reactor section;

reacting a third portion of carbon monoxide in the reformate stream in said third reactor section in the presence of a third catalyst at a third temperature; and maintaining said third temperature at a value different from at least one of said first and second temperatures.

24. The method of claim 23 wherein said third temperature is lower than at least one of said first and second temperatures, said third catalyst and said third temperature are selected to oxidize carbon monoxide while minimizing a reverse water gas shift reaction.

25. The method of claim 22 wherein said first catalyst and said first temperature are selected to promote oxidation of carbon monoxide thereby providing light-off of said oxidation reaction at said first temperature.

26. A method for treating a hydrogen-containing reformate stream within a preferential oxidation reactor to reduce the carbon monoxide content of the reformate stream, said method comprising the steps of:

reacting a first portion of carbon monoxide in the reformate stream at a first temperature in the presence of a first catalyst within a first section of the reactor to oxidize said first portion of carbon monoxide;

directing the reformate stream from said first reactor section to a second reactor section;

reacting a second portion of carbon monoxide in the reformate stream in said second reactor section in the presence of a second catalyst at a second temperature to oxidize a second portion of the carbon monoxide; and maintaining said second temperature lower than said first temperature, wherein said second catalyst and said second temperature are selected to promote oxidation of carbon monoxide while minimizing a reverse water gas shift reaction.

27. A method for treating a hydrogen-containing reformate stream within a preferential oxidation reactor to reduce the carbon monoxide content of the reformate stream, said method comprising the steps of:

reacting a first portion of carbon monoxide in the reformate stream at a first temperature in the presence of a first catalyst within a first section of the reactor to oxidize said first portion of carbon monoxide;

directing the reformate stream from said first reactor section to a second reactor section;

reacting a second portion of carbon monoxide in the reformate stream in said second reactor section in the presence of a second catalyst at a second temperature to oxidize a second portion of the carbon monoxide; and maintaining said second temperature greater than said first temperature.

28. The method of claim 27 further comprising the steps of:

directing the reformate stream from said second reactor section to a third reactor section;

reacting a third portion of carbon monoxide in the reformate stream in said third reactor section in the presence of a third catalyst at a third temperature; and maintaining said third temperature at a value different from at least one of said first and second temperatures.

29. The method of claim 28 wherein said third temperature is lower than at least one of said first and second temperatures, said third catalyst and said third temperature are selected to oxidize carbon monoxide while minimizing a reverse water gas shift reaction.

30. The method of claim 27 wherein said first catalyst and said first temperature are selected to promote oxidation of the carbon monoxide at a greater rate at said first temperature, as compared to a rate at which said second catalyst is operable at said first temperature to oxidize the carbon monoxide, thereby providing light-off of said oxidation reaction at said first temperature.

31. The method of claim 27 wherein said second catalyst and said second temperature are selected to promote preferential oxidation of carbon monoxide in the presence of hydrogen.

\* \* \* \* \*